US006191947B1

(12) United States Patent
Titus et al.

(10) Patent No.: US 6,191,947 B1
(45) Date of Patent: Feb. 20, 2001

(54) ELECTRONIC TRIP UNIT AND MOUNTING METHOD

(75) Inventors: Solomon R. Titus, Alpharetta; Mario Bilac, Lawrenceville, both of GA (US)

(73) Assignee: Siemens Energy & Automation, Inc., Alpharetta, GA (US)

( * ) Notice: Under 35 U.S.C. 154(b), the term of this patent shall be extended for 0 days.

(21) Appl. No.: 09/161,796

(22) Filed: Sep. 28, 1998

(51) Int. Cl.[7] .......... H02B 1/04
(52) U.S. Cl. .......... 361/726; 361/608; 335/202
(58) Field of Search .......... 335/202; 361/42, 361/93.1, 605, 608, 609, 622, 623, 641, 643, 652, 656, 673, 724–726, 729–732, 752, 829, 832, 836, 837, 807, 809

(56) References Cited

U.S. PATENT DOCUMENTS

| | | | |
|---|---|---|---|
| 4,667,263 | | 5/1987 | Morris et al. . |
| 4,686,600 | | 8/1987 | Morris et al. . |
| 4,700,161 | | 10/1987 | Todaro et al. . |
| 4,884,048 | * | 11/1989 | Castonguay . |
| 5,153,544 | | 10/1992 | Castonguay et al. . |
| 5,218,331 | | 6/1993 | Morris et al. . |
| 5,426,406 | * | 6/1995 | Morris . |
| 5,426,592 | | 6/1995 | Leone et al. . |
| 5,479,143 | | 12/1995 | Payet-Burin . |
| 5,483,211 | | 1/1996 | Carrodus et al. . |
| 5,485,134 | | 1/1996 | Seymour et al. . |
| 5,486,667 | | 1/1996 | Castonguay et al. . |
| 5,490,086 | | 2/1996 | Leone et al. . |
| 5,508,670 | | 4/1996 | Mantzouridis et al. . |
| 5,634,554 | | 6/1997 | Dimarco et al. . |
| 5,874,877 | * | 2/1999 | Kawashima . |

* cited by examiner

*Primary Examiner*—Gerald Tolin

(57) ABSTRACT

An electronic trip unit is adapted for connection to a circuit breaker for circuit interruptions. The electronic trip unit includes a frame module shaped to define a recess. An electronics module is releasably connected to the frame module. The electronics module has a housing, a circuit board assembly, and a facing surface providing access for adjustment of the electronics module. The housing of the electronics module is sized and shaped to fit at least partially within the recess defined by the frame module. An engagement surface is positioned for releasable engagement between the frame module and the electronics module in order to permit removal and replacement of the electronics module with respect to the frame module.

21 Claims, 5 Drawing Sheets

ELECTRONIC TRIP UNIT AND MOUNTING METHOD

FIELD OF THE INVENTION

The present invention relates generally to a circuit breaker and, more particularly, to an electronic trip unit structure and mounting method.

BACKGROUND OF THE INVENTION

It is common for a circuit breakers to employ elements which hip the circuit breakers under various over-current conditions. Such elements, commonly referred to as "hip units," typically respond to relatively long duration overload conditions to trip the breaker when a specified current level is exceeded for a period of time.

When thermal and magnetic elements are employed to trip the circuit breaker, a bi-metallic element responds to relatively long duration overload conditions. In a typical thermal trip unit, at least a portion of the current flowing through the breaker is channelled through the bi-metallic element. The ohmic resistance of the bi-metallic element causes it to generate heat. As the bi-metallic element becomes warmer, it bends and, when it reaches a predetermined temperature, it engages a trip mechanism that releases a latch which holds the breaker contact closed. When this latch is released, the breaker contacts open.

A typical magnetic tripping element includes an armature which is attracted by a magnetic field generated by a relatively high magnitude over-current flowing through the breaker. This magnetic field is concentrated by a magnetically permeable yoke which surrounds the conductor through which the current flows. When the armature is attracted to the yoke, it also engages the trip mechanism causing the circuit breaker to open.

It is desirable to be able to configure and adjust the current levels and current durations, which cause a breaker to trip, beyond the capability of conventional thermal and magnetic trip units. It is also desirable to customize the circuit breaker to a particular application. The use of electronic trip units provides a more accurate adjustment of the current levels. In such electronic trip units, a circuit assembly with switches is used to facilitate such adjustment and configuration by the unit's user.

Although electronic trip units have proven to be beneficial, it has become recognized that the replacement or first-time installation of such electronic trip units in the field requires disassembly of the breaker. First time installation may be required when the user of the breaker desires to upgrade from one trip unit to another. Replacement may become necessary if a component of the electronic trip unit fails. It has also been recognized that different types of electronic trip units cannot be easily interchanged such as when an upgrade is desired or the application so requires.

Accordingly, it is an object of this invention to overcome the disadvantages of conventional electronic trip units.

SUMMARY OF THE INVENTION

This invention is embodied in an electronic trip unit that is adapted for connection to a circuit breaker base for circuit interruption. The electronic trip unit includes a frame module that encloses at least one transformer that is positioned between a line side bus and a load side bus. The frame module is shaped to define a recess that extends inwardly from an outer surface of the frame module.

The electronic trip unit also includes an electronic module that is releasably connected to the trip unit's frame module and to the transformer positioned within the frame module. The electronic module includes a housing that is shaped to define an interior space. A circuit board assembly is mounted within the interior space and a face of the electronic module provides access to the user for adjustment of the electronic module. The housing of the electronic module is sized and shaped to fit at least partially within the recess defined by the frame module.

An engagement surface is provided in the electronic trip unit and is positioned for providing releasable engagement between the frame module and the electronics module. The engagement surface permits removal and replacement of the electronics module from and to the frame module.

According to a preferred aspect of the electronic trip unit, the housing of the electronics module includes mating housing components and a face plate which together at least partially define the module's interior space. In one exemplary embodiment, the housing includes an interior surface that defines a guide for positioning the circuit board assembly. If the circuit board assembly includes several boards, the interior surface of the housing can include plural guides for positioning the boards and for maintaining a predetermined distance between facing surfaces of the boards.

The face plate of the electronic trip unit can define an opening. Such an opening can provide viewing access to a display such as a liquid crystal display that can be attached to the circuit board assembly. The opening can also provide access to a connector attached to the circuit board assembly. Such an opening can also provide access to a switch that is attached to the circuit board assembly.

A mounting bracket can be made a part of the electronic trip unit and it can extend between an exterior surface of the housing and an interior surface of the frame module's recess. The mounting bracket can define the engagement surface that permits releasable engagement between the housing and frame module. Also, the mounting bracket can be attached to the electronic trip unit's housing.

DETAILED DESCRIPTION OF THE INVENTION

Figure 1:
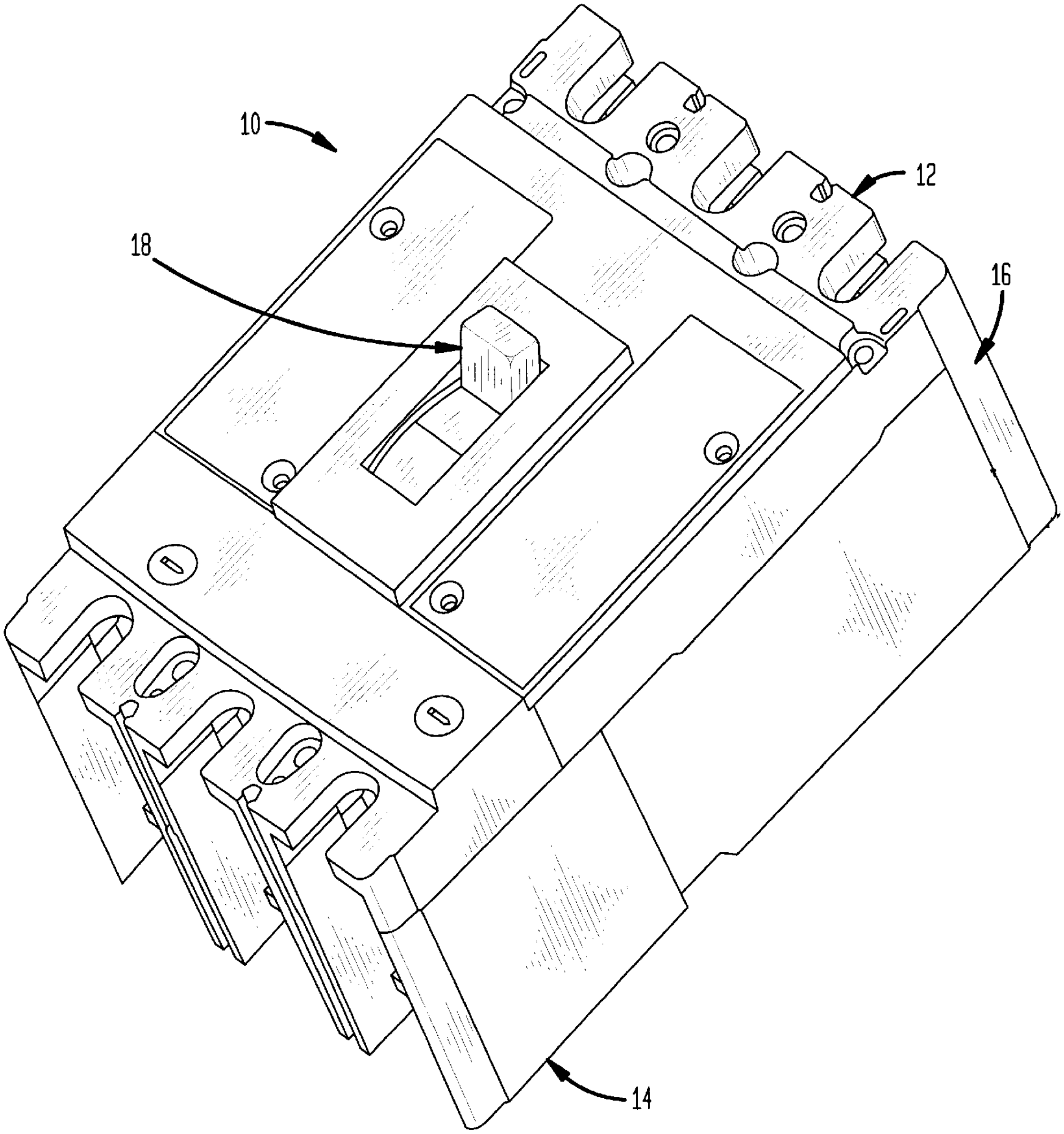
FIG. 1 is a perspective view of an embodiment of a circuit breaker embodying aspects of this invention.

It will be appreciated that the following description is intended to describe several embodiments of the invention that are selected for illustration in the drawings. The described embodiments are not intended to limit the spirit or scope of the invention, which is defined separately in the appended claims. The various drawings are not intended to be to any particular scale or proportion.

Referring to FIG. 1, a circuit breaker is generally designated by the numeral "10." It includes a cover 12, a trip unit 14, and switch unit or breaker frame 16. A toggle handle 18 is provided to manually open and close contact arms in the circuit breaker 10. The circuit breaker 10 shown in FIG. 1 is a multi-part molded case circuit breaker. Although this invention is not so limited, circuit breaker 10 can be a 160 A, 250 A, 400 A, 630 A, 800A, 1250A, or 1600 A unit rated at 100 KA interruption capability.

The exemplary circuit breaker is a three-phase breaker having three sets of contacts for interrupting current in each of the three respective phases. In the exemplary embodiment of the invention, each phase includes separate breaker contacts and a separate trip mechanism. The center pole of the circuit breaker includes an operating mechanism which controls the switching of all three poles of the breaker. Although the present invention is described in the context of a three-phase circuit breaker, it may be practiced in a single-phase circuit breaker or other multi-phase breakers.

Figure 2:
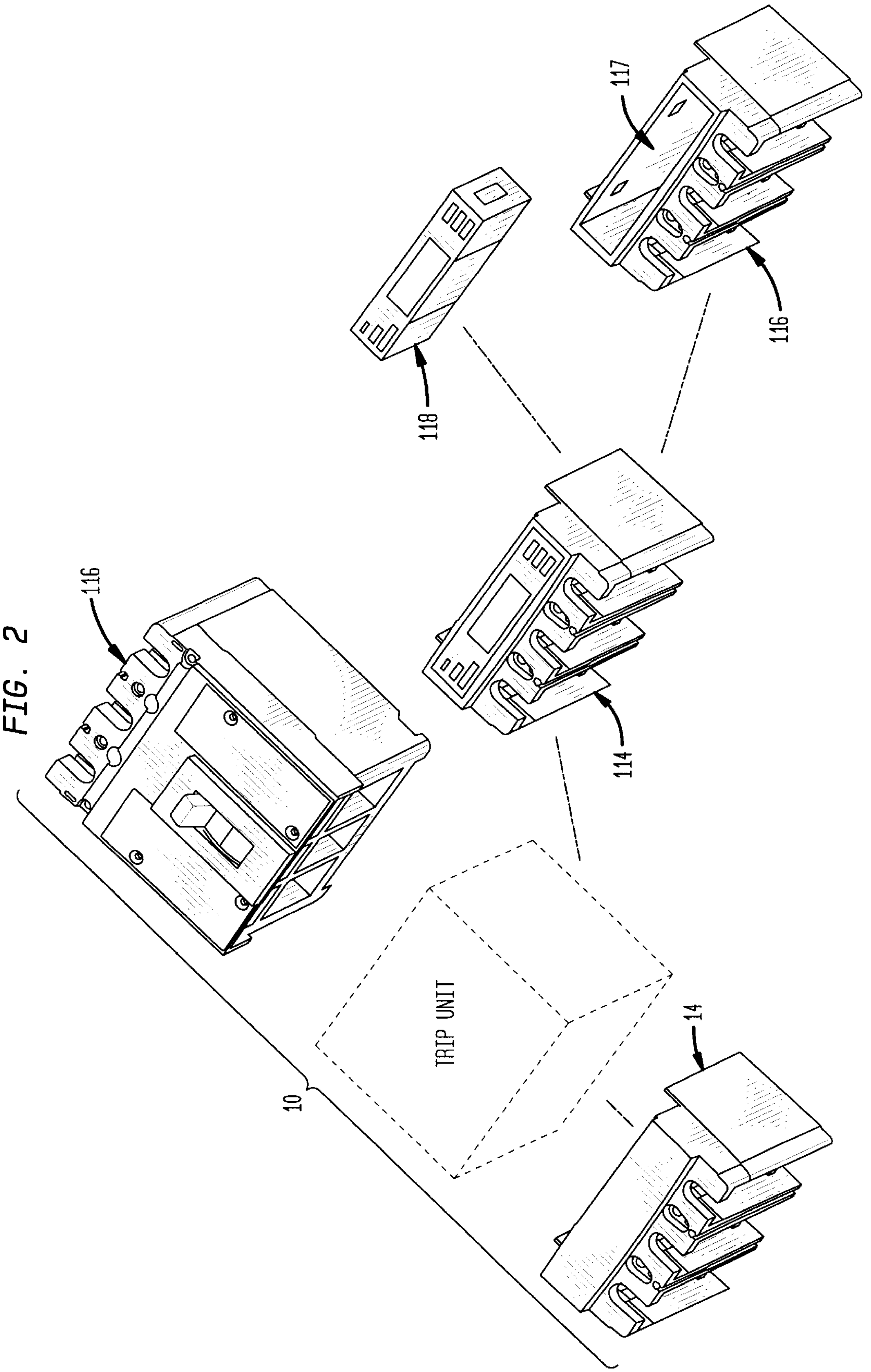
FIG. 2 is an exploded perspective view of the circuit breaker shown in FIG. 1.

Referring now to FIG. 2, circuit breaker 10 includes a circuit breaker frame 16, which may also be referred to as a switch unit or sub breaker. The schematic representation of a generic trip unit indicates the relative position of the trip unit with respect to the circuit breaker frame 16. The trip unit is releasably engagable to circuit breaker frame 16 by one or more locking mechanisms that are known in the art. This permits the replacement of trip units in the field either because of a failure of the previous trip unit or a desire to upgrade to a newer or more advanced type of trip unit. For example, FIG. 2 illustrates a thermal magnetic trip unit 14 that can be attached to circuit breaker frame 16. If desired, thermal magnetic trip unit 14 can be released or removed from circuit breaker frame 16 so that a new or improved trip unit can be installed in its place.

The numeral "114" generally designates an electronic trip unit embodying aspects of this invention. It can have a mounting structure similar to that of thermal magnetic trip unit 14 so that it can be releasably attached to circuit breaker frame 16. This feature permits removal of thermal magnetic trip unit 14 from circuit breaker frame 16 so that electronic trip unit 114 can be installed in its place.

Electronic trip unit 114 has two main components: a frame module 116; and an electronics module 118. As illustrated in FIG. 2, electronics module 118 fits within a recess 117 of frame module 116 to form electronic trip unit 114. Electronic trip unit 114 is then attached to circuit breaker frame 16 in order to form circuit breaker 10.

Electronics module 118 is releasably engaged within the recess 117 in the top surface of frame module 116 so that it can be removed and replaced. Such removal and replacement preferably does not require any disassembly of circuit breaker 10 or circuit breaker frame 16 or frame module 116 of electronic trip unit 114. Instead, electronics module 118 can simply be installed in frame module 116 by making the necessary electrical connections between electronics module 118 and frame module 116 and simply by inserting electronics module 118 into the frame module recess 117. Likewise, electronics module 118 can be easily removed from frame module 116 by sliding it out of recess 117 and breaking electrical connections between the electronics module and the frame module. Electronics module 118 is, therefore, rather accessible to the user of circuit breaker 10 so that the module can simply be removed and replaced if necessary without disassembly of other components of circuit breaker 10.

Figure 3:
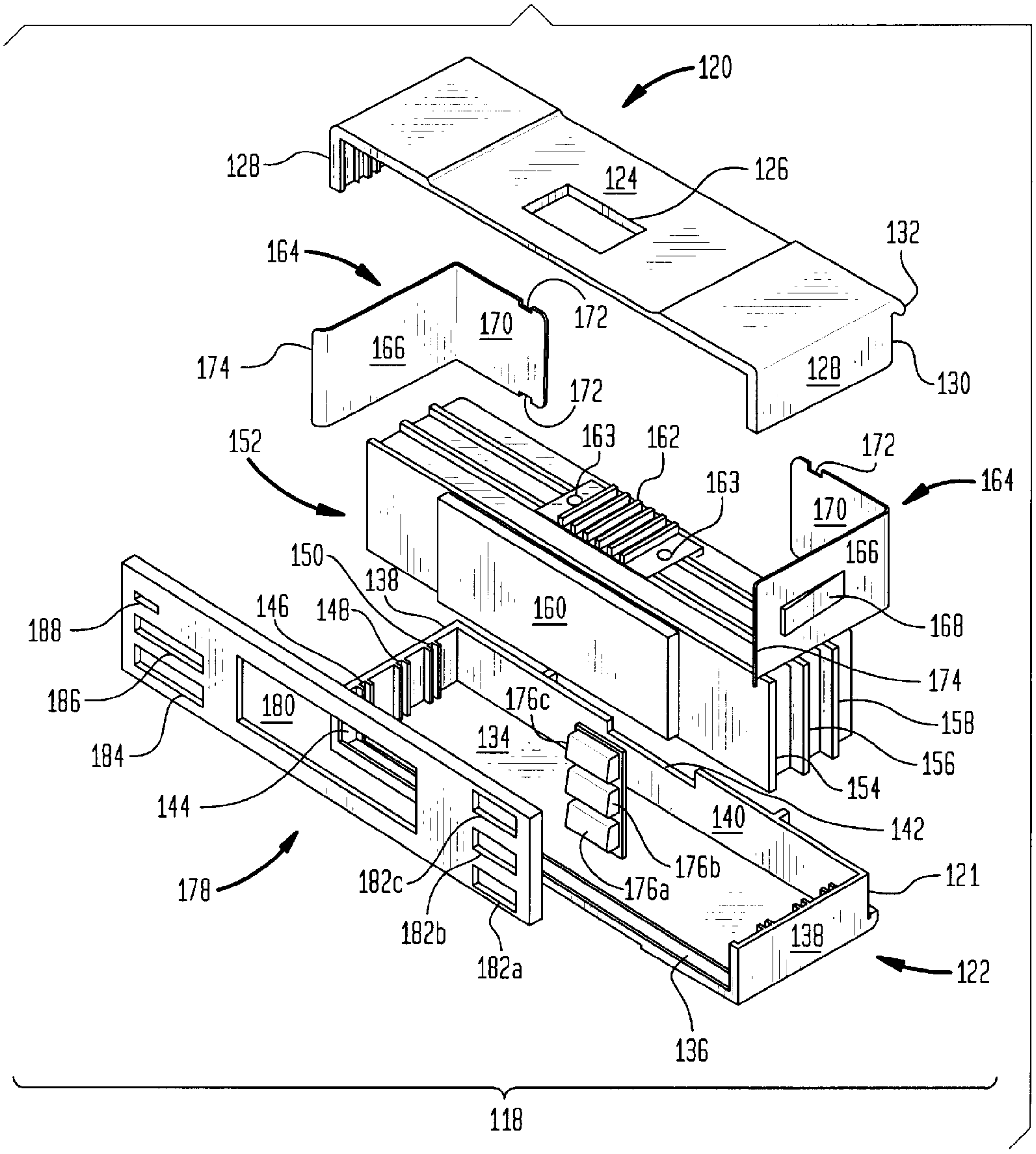
FIG. 3 is an exploded perspective view of an embodiment of an electronics module according to this invention.

Details of electronics module 118 will now be described with reference to FIG. 3, which illustrates an exploded view of the electronics module 118 in order to reveal exemplary aspects of this invention. Electronics module 118 includes a top cover 120 and a base cover 122. As will be described, top and base covers 120 and 122 can be made identical to one another in order to reduce manufacturing costs and the number of components necessary for construction of the electronics module 118. In other words, top cover 120 can be simply inverted to provide the base cover 122. Alternatively, base cover 122 can be a different component including features not found in top cover 120.

Top cover 120 includes a top wall 124 which is provided with a generally rectangular opening 126 for positioning adjacent to a heat sink portion of the assembly as will be described later. Top cover 120 also includes a pair of opposed side walls 128 at opposite ends of top wall 124 as well as a rear wall 130 (not visible in FIG. 3) that extends between the side walls 128 along the length of top wall 124. A flange portion 132 extends outwardly and downwardly from the rear surface of rear wall 130. Flange 132 can extend all the way across rear wall 130 from one side wall 128 to the other. Alternatively, a flange 132 can be provided at the ends of rear wall 130 at positions proximal to opposed side walls 128, 128. The purpose of flange 132 is to help capture a mounting bracket that will be described further below.

Base cover 122 includes a base wall 134 having a channel 136 that is provided to engage and locate a face plate that will be described later. Base cover 122 also includes a pair of opposed side walls 138, 138 as well as a rear wall 140. Again, base cover 122 can be the same as top cover 120. If so, rear wall 140 would correspond to rear wall 130, for example.

Rear wall 140 of base cover 122 is provided with a recess 142 to accommodate a connector that would extend between the electronic components of electronics module 118 and the transformer or transformers mounted within the electronic trip unit. Channels 144 are provided in side walls 138 to accommodate the face plate of electronics module 118 which will be described in detail later. Also formed in side walls 138 are a series of channels or edge guides 146, 148, and 150. Channel 146 can be considered a front channel that is provided to engage the edge of a printed circuit (PC) board. Channel 148 can be considered a middle channel for engaging another PC board and channel 150 can be considered a rear channel for engaging yet another PC board. Channels 146, 148 and 150 position PC boards so that they are engaged within the housing of the electronics module and so that the spacing between facing surfaces of the PC boards remains fixed.

A PC board assembly 152 includes a front PC board 154, a middle PC board 156, and a rear PC board 158. PC boards 154, 156 and 158 are stacked with respect to one another. Electrical connection between the PC boards is provided by board connectors or by ribbon connectors at the discretion of the manufacturer. A liquid crystal display (LCD) 160 is mounted against a facing surface of front PC board 154.

A heat sink 162 is attached by means of fasteners 163 to the PC board assembly 152. The purpose of heat sink 162 is to dissipate heat generated in and around PC board assembly 152 during operation of electronics module 118. The opening 126 in top wall 124 of top cover 120 is positioned adjacent to heat sink 162 so that heat can be dissipated outwardly from the electronics module 118 through the opening 126.

A pair of brackets 164 can be attached as a pail of electronics module 118 in order to facilitate the releasable engagement of electronics module 118 within frame module 116. Brackets 164 include a side leg 166 having an outwardly facing surface on which is formed an engagement surface 168. In this embodiment, engagement surface 168 is in the form of a protrusion extending outwardly away from side leg 166. A corresponding hole or recess or other mating structure is provided at the side walls of the recess 117 that is formed in the top of frame module 116 so that engagement surface 168 will engage the recess to prevent unintended separation of electronics module 118 from frame module 116. Engagement surface 168 is also shaped so that it can be released by a user of electronics module 118 in order to disengage electronics module 118 from frame module 116. Such disengagement provides the user with the ability to readily remove electronics module 118 from frame module 116 for repair or replacement.

Each of the brackets 164 also includes a rear leg 170 that is oriented at about a 90° angle with respect to side leg 166. The rear legs 170 are captured between the flanges 132 of top and base covers 120 and 122. As top cover 120 is engaged to base cover 122, rear legs 170 are captured between the respective flanges 132. Also, locating notches 172 are provided on rear legs 170. These locating notches 172 are captured by top and base cover components 120 and 122.

Each of the brackets 164 also includes a flange 174 that extends forwardly and outwardly from side leg 166. In this exemplary embodiment, flanges 174 extend outwardly at about a 45° angle. Flanges 174 provide a surface for engagement by the user (such as by the user's fingers or fingernails) in order to facilitate disengagement of engagement surface 168 and removal of electronics module 118 from frame module 116.

A series of push buttons 176*a*–176*c* are provided for mounting adjacent to front PC board 154. In this embodiment, three push buttons are provided; namely lower push button 176*a,* middle push button 176*b,* and top push button 176*c.* These push buttons are connected to switch mechanisms located on front PC board 154. They also extend through openings in a face plate as will be described. Actuation of one of the push buttons 176*a*–176*c* by a user of electronics module 118 can be used to adjust the electronic module's setting.

A face plate 178 is also provided as a part of the housing of electronics module 118. Face plate 178 cooperates with the clam shell-type top and base cover components 120 and 122 to define the housing's interior space. An edge of face plate 178 is engaged within channels 136 and 144 of the base wall 134 and side walls 138 of base cover 122, respectively. Although not visible in FIG. 3, such channels are also provided in top cover 120. Accordingly, when top cover 120 is engaged to base cover 122, face plate 178 is captured therebetween.

Face plate 178 includes a display opening 180 that is positioned adjacent to LCD 160 so that a user looking at face plate 178 would be able to see the information displayed by LCD 160 through display opening 180. At the right-hand portion of face plate 178 are provided a series of button openings 182*a*–182*c* to accommodate push buttons 176*a*–176*c*. A lower button opening 182*a* accommodates lower push button 176*a,* middle button opening 182*b* accommodates middle push button 176*b,* and a top button opening 182*c* accommodates top push button 176*c*. Also provided in face plate 178 is a connector opening 184 for providing access to a connector that may be mounted to a facing surface of front PC board 154. A rating plug opening 186 is also provided in face plate 178 as is an LED opening 188. The positions and quantities of such openings in face plate 178 are not important to the invention and can vary depending on the structure and type of the PC boards selected for use in electronics module 118.

A raised section 121 is provided along an edge surface of a side wall 138 of base cover 122 as well as along an edge surface of a portion of rear wall 140. If top cover 120 and base cover 122 are the same, then rotation of base cover 122 to form top cover 120 would position raised section 121 above opposite side wall 138 of base cover 122 and along the other portion of rear wall 140. The purpose of raised section 121 is to facilitate one form of an engagement between top cover 120 and base cover 122 so that the components cannot be unintentionally disengaged. It is beneficial for electronics module 118 to be a unitary assembly that can be easily installed and then simply discarded after one-time use. Accordingly, raised section 121 facilitates a bond between top cover 120 and base cover 122 by means of an ultrasonic welding procedure. Accordingly, when the cover components are positioned adjacent to one another, raised section 121 on each of the components acts as an energy director so that the section 121 melts first before other portions of the electronics module housing during the ultrasonic welding procedure, thereby bringing about a fused bond between top cover 120 and base cover 122. Such an ultrasonic weld provides bonded engagement between the cover components and traps face plate 178. It also encloses PC board assembly 152 while grasping the mounting brackets 164. The resulting electronics module 118 is a unitary assembly that can be easily installed or removed.

Figure 4:
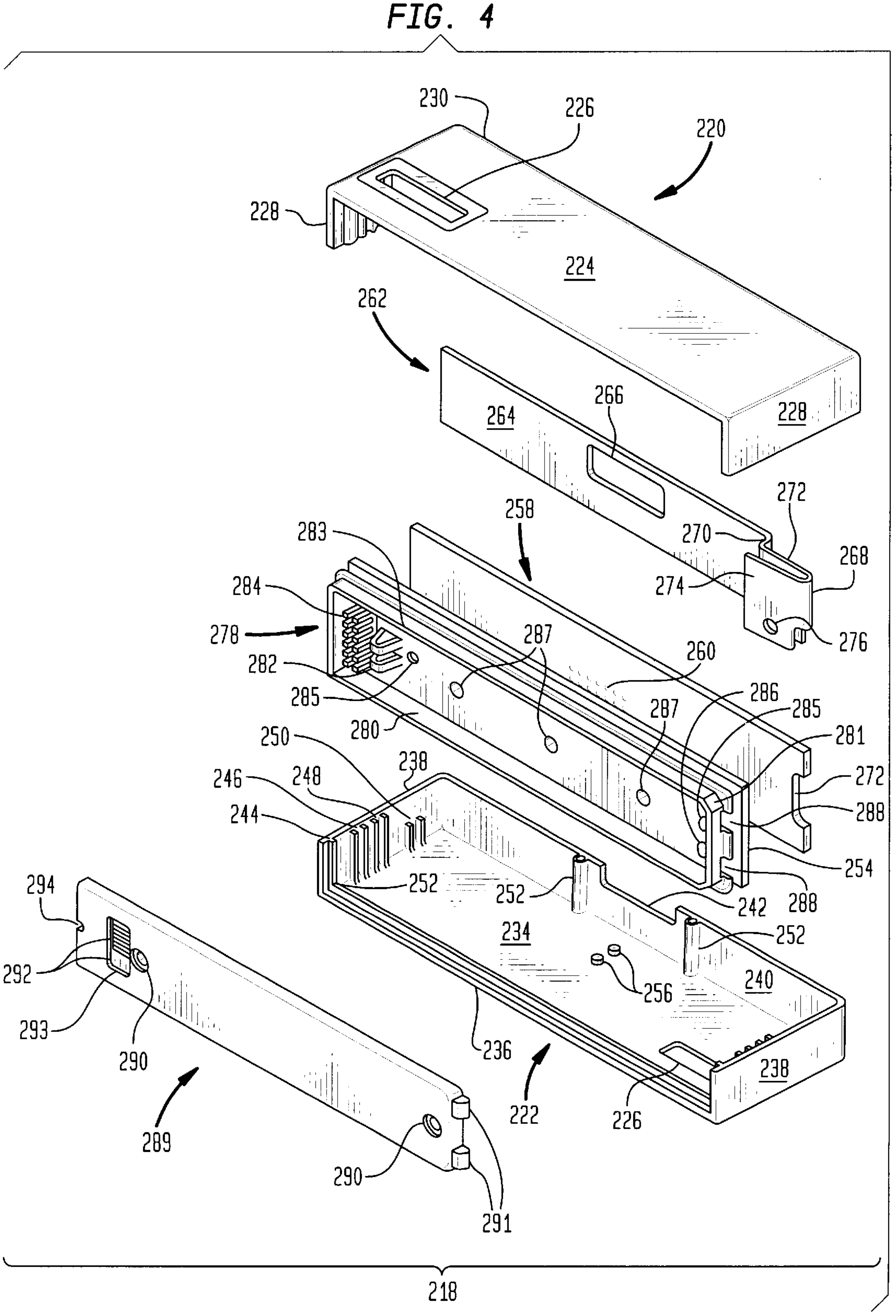
FIG. 4 is an exploded perspective view of another embodiment of an electronics module according to this invention.

Another embodiment of an electronics module according to this invention is generally designated by the numeral "218" in FIG. 4. It also includes a top cover 220 and a base cover 222 that can optionally be the same as one another as in the FIG. 3 embodiment. Top cover 220 includes a top wall 224 and a connector opening 226 is provided in a base wall 234 of base cover 222 for a connector port. Opening 226 also appears at the top wall 224 of top cover 220 simply because of the inversion of base cover 222 to form top cover 220 if those cover components are the same. Top cover 220 also includes a pair of side walls 228 and a rear wall 230 (not shown) that extends between the side walls.

Base wall 234 of base cover 222 is provided with a channel 236 for accommodating and positioning a face plate as will be described later. Base cover 222 also includes opposed side walls 238. A rear wall 240 extends between the side walls and also defines a recess 242 which provides access for a connector that is used for electrical connection between electronics module 218 and one or more transformers in the frame module. Channels 244 also extend along side walls 238 to accommodate and position the face plate to be described later.

A series of channels 246, 248 and 250 are also provided on side walls 238 in order to act as edge guides for the printed circuit boards of the electronics assembly. More specifically, a front channel 246 is provided as an edge guide for a printed circuit board and a middle channel 248 is provided as an alternative location for that same printed circuit board, depending on its type. For example, if a printed circuit board is utilized without an LCD, then the printed circuit board can be positioned at the front channel 246 because excess clearance between the printed circuit board and the face plate is not required. However, if a PC board with an LCD display is used and additional clearance is required, then that printed circuit board can be positioned in middle channel 248. The rear channel 250 is provided as an edge guide for a separate PC board, as will be described later.

A front PC board 254 is provided for location in this embodiment in the front channel 246 formed in the side walls 238 of base cover 222. It does not include an LCD display and, therefore, does not require the additional clearance provided by middle channel 248. A rear PC board 258 is provided for positioning in rear channel 250. It has a rear connector 260 attached to its opposite side (only the leads of rear connector 260 are visible in FIG. 4). A number of mounting bosses 252 are provided along the edges of wall surfaces of the top and base covers 220 and 222 in order to provide alignment between the components for assembly to assure that the PC boards are properly captured and enclosed.

A pair of detents 256 is provided on the base wall 234 of base cover 222 (and may also be provided on top wall 224 of top cover 220) in order to stabilize the rear PC board 258 that is engaged within rear channel 250. Such detents 256 provide stability so that mechanical press-fit connection can be made between rear connector 260 and an external connector (not shown) without undue displacement of rear PC board 258.

A heat sink 262 is also provided as a part of electronics module 218. It includes a body portion 264 in the form of a longitudinally extending sheet of material such as aluminum. Body portion 264 has an opening 266 through which a connector such as rear connector 260 can extend for connection to external components. Heat sink 262 also includes a mounting portion 268 that is connected to body portion 264 by means of a bend at 270. Mounting portion 268 includes a rear leg 272 connected by means of a bend to a front leg 274.

A screw hole 276 extends through rear leg 272 and front leg 274. Screw hole 276 permits mechanical fastening between heat sink 262 and rear PC board 258. Specifically, the bent portion extending between rear leg 272 and front leg 274 fits within the recess 272 in the side edge of rear PC board 258. A screw is inserted through screw hole 276 and a hole in rear PC board 258 (not shown), and an appropriate nut and washer are assembled to provide mechanical engagement between heat sink 262 and rear PC board 258. Heat sink 262 helps to dissipate heat that is generated by the components housed within electronics module 218.

Electronics module 218 also includes a face plate 278 that is intended to be engaged in channels 236 and 244 of the top and base cover components 220 and 222. Face plate 278 is provided with a perimeter flange 280. An angled portion 281 is provided in order to prevent incorrect installation of electronics module 218, as will be described later. Face plate 278 also includes a pair of loops 282 which are provided for the engagement of a clear shield. Face plate 278 is also provided with an opening 283 (only partially visible in FIG. 4) for an LED that is attached to front PC board 254. Also provided in face plate 278 is an opening 284 for a configuration/test connector.

Screw holes 285 are provided for mechanical engagement of a clear shield and an opening 286 is also provided for visual access to an LED that can be mounted on front PC board 254. A series of three openings 287 are also provided in face plate 278 in order to provide access to three rotary switches that are mounted to the printed circuit board 254. These switches are used to adjust the setting of electronics module 218 by a user. At the right-hand side of face plate 278 are provided two openings 288 so that a clear shield can be engaged in such a way as to prevent access to the three rotary switches and to avoid tampering with a desired setting.

A clear shield 289 is provided to cover portions of face plate 278 to limit such access to the rotary switches so that unauthorized adjustment cannot be made. A pair of mounting holes 290 are provided in clear shield 289 for mechanical engagement of the clear shield to face plate 278, utilizing screw holes 285. A pair of tabs 291 are provided at the right-hand side edge of clear shield 289 for engagement in openings 288 of face plate 278.

A pair of openings 292 is provided for accommodation of loops 282 so that the loops can extend through the clear shield. A recess 293 is provided at the location surrounding openings 292 so that a wire or some other suitable component can be inserted through loops 282 in order to prevent unauthorized removal of clear shield 289 and the resulting access to the adjustment switches that extend through openings 287 in face plate 278. A pry opening 294 is provided at the left-hand side edge of clear shield 289.

Upon assembly, tabs 291 of clear shield 289 are engaged in openings 288 in face plate 278, loops 282 are extended through openings 292, and a wire is inserted through loops 282 in order to lock clear shield 289 in place. Also, screws are used for mounting clear shield 289 to face plate 278 by insertion of the screws through mounting holes 290 and 285. Pry opening 294 can be used to pry clear shield 289 away from face plate 278 after removal of the wire from loops 282.

This electronics module assembly 218 embodiment can be formed by conducting an ultrasonic welding procedure between the cover components 220 and 222. Such a procedure provides a unitary assembly.

Figure 5:
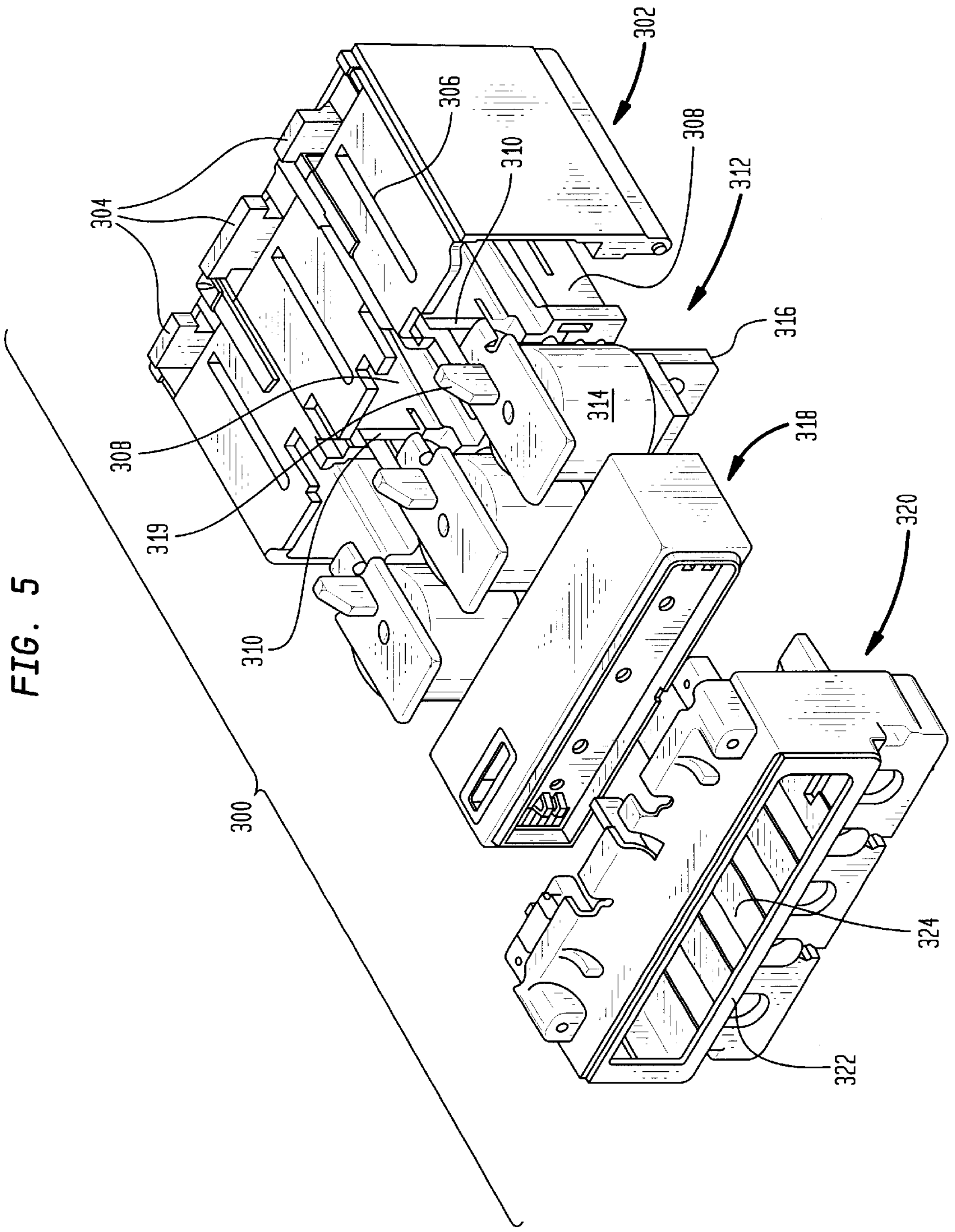
FIG. 5 is an exploded perspective view of an embodiment of an electronic trip unit that includes the electronics module shown in FIG. 4.

Another embodiment of an electronic trip unit 300 according to aspects of this invention is illustrated in the exploded view provided in FIG. 5. Electronic trip unit 300 includes a trip unit base 302 having a set of dove tail tabs 304 which accommodate the mechanical connection between electronic trip unit 300 and the circuit breaker base. A group of slots 306 are provided to accommodate the line side bus of the trip unit. A pair of internal walls 308 separate trip unit base 302 into compartments which enclose a series of three current transformers 312, each including a torroidal core 314 positioned between a load side bus 316 and a line side bus 319.

An electronics module 318 is mounted adjacent to current transformers 312 so that electrical connection can be made therebetween. Electronics module 318 can be similar to electronics module 118 (FIG. 3) or electronics module 218 (FIG. 4). A trip unit cover 320 has a facing wall 322 and an opening 324 defined in the facing wall 322 for access to the electronics module 318.

Referring back to FIG. 4, the angled portions 281 on the perimeter flange 280 of face plate 278 can be used to assure correct orientation of electronics module 218 or 318 with respect to trip unit cover 320 so that proper assembly of those components can be assured. Opening 324 in trip unit cover 320 can be provided with a shape corresponding to perimeter flange 280 and angled portions 281 and the perimeter flange 280 can extend through the opening 324 in facing wall 322 from the rear of trip unit cover 320.

Electronics module 318 can be captured between trip unit base 302 and trip unit cover 320 when the base 302 and cover 320 are assembled. Removal of trip unit cover 320 simply by removal of mechanical fasteners (not shown) then permits access to the housing of electronics module 318 for removal of the electronics module. Alternatively, electronics module 318 can be provided with an engagement surface such as the one provided by brackets 164 of electronics module 118 (FIG. 3). With such an engagement surface, the housing of electronics module 318 can be accessed from a location on the opposite side of an outer face of trip unit cover 320 so that it can be removed and replaced without the need to remove and replace trip unit cover 320.

The embodiments of the circuit breaker and electronics module described herein can be modified without departing from the scope of the invention. The various components of electronics modules 118, 218 and 318 can be formed from a variety of materials. For example, the face plate components can be formed from a thermoplastic material and the cover components can be formed from a thermoset plastic. Although the cover components of the module are preferably joined by ultrasonic welding when formed in the clam-shell configuration, they can also be joined by plastics welding, adhesives, or by mechanical fasteners such as screws, rivets, snaps and equivalent hardware. The clear shield of electronics module 218 (FIG. 4) is preferably formed from clear polycarbonate, although other materials are contemplated as well. Although the heat sink is preferably aluminum, other materials can be used.

The brackets 164 of electronics module 118 (FIG. 3) are preferably formed from a spring material such as spring steel or stainless steel. Such brackets or other means for engaging the electronics module within the frame module can be attached to electronics modules 218 and 318. Alternatively, an engagement surface can be provided within (or connected to) the recess in the frame module for engagement of the electronics module.

While several embodiments of this invention and variations thereof have been described with reference to the drawings, it will be appreciated that additional variations and modifications of the embodiments can be made without departing from the spirit or scope of this invention. The various materials described herein can be substituted for equivalent materials and the various components can be substituted for equivalent components. Also, components described herein can be combined into single components and single components can be separated into multiple components, if desired. The scope of the invention will now be defined in the appended claims.

What is claimed is:

1. An electronic trip unit adapted for connection to a circuit breaker for circuit interruption, said electronic trip unit comprising:

a frame module shaped to define a recess;

an electronics module releasably engaged to said frame module, said electronics module having a housing to define an interior space, a circuit board assembly mounted within said interior space, and a facing surface providing access for adjustment of said electronics module, said housing of said electronics module fitting at least partially within said recess defined by said frame module; and an engagement surface positioned for releasable engagement between said frame module and said electronics module, wherein said engagement surface releasably engages said electronics module to said frame module and permits removal and replacement of said electronics module with respect to said frame module.

2. The electronic trip unit defined in claim 1, wherein said housing of said electronics module comprises mating housing components and a face plate which together define said interior space.

3. The electronic trip unit defined in claim 1, wherein said housing comprises an interior surface defining a guide for positioning said circuit board assembly.

4. The electronic trip unit defined in claim 3, wherein said circuit board assembly comprises a plurality of boards and wherein said interior surface of said housing defines a plurality of guides for positioning said boards and for maintaining a predetermined distance between facing surfaces of said boards.

5. The electronic trip unit defined in claim 2, wherein said face plate defines an opening extending therethrough for access to said interior space.

6. The electronic trip unit defined in claim 5, wherein said opening defined by said face plate provides viewing access to a display attached to said circuit board assembly.

7. The electronic trip unit defined in claim 5, wherein said opening defined by said face plate provides access to a connector attached to said circuit board assembly.

8. The electronic trip unit defined in claim 5, wherein said opening defined by said face plate provides access to a switch attached to said circuit board assembly.

9. The electronic trip unit defined in claim 1, wherein said housing of said electronic module defines an opening positionable adjacent to a heat sink attached to said circuit board assembly.

10. The electronic trip unit defined in claim 1, further comprising a mounting bracket extending between an exterior surface of said housing of said electronics module and an interior surface of said recess defined in said frame module.

11. The electronic trip unit defined in claim 1, wherein said engagement surface extends outwardly from said housing for engagement within said recess defined in said frame module.

12. An electronic trip unit adapted for connection to a circuit breaker for circuit interruption, said electronic trip unit comprising:

a frame module shaped to define a recess;

an electronics module releasably connected to said frame module, said electronics module having a housing shaped to define an interior space, a circuit board assembly mounted within said interior space, and a facing surface providing access for adjustment of said electronics module, said housing fitting at least partially within said recess defined by said frame module, wherein said housing of said electronics module comprises mating housing components and a face plate which together at least partially define said interior space, an engagement surface positioned for releasable engagement between said frame module and said electronics module, wherein said engagement surface releasably engages said electronics module to said frame module and permits removal and replacement of said electronics module with respect to said frame module.

13. The electronic trip unit defined in claim 12, wherein said housing comprises an interior surface defining a guide for positioning said circuit board assembly.

14. The electronic trip unit defined in claim 13, wherein said circuit board assembly comprises a plurality of boards and wherein said interior surface of said housing defines a plurality of guides for positioning said boards and for maintaining a predetermined distance between facing surfaces of said boards.

15. The electronic trip unit defined in claim 12, wherein said engagement surface extends outwardly from said housing for engagement within said recess of said frame module.

16. A circuit breaker comprising:

a breaker frame;

a frame module releasably engaged to said breaker frame, said frame module enclosing at least one transformer positioned between a line side bus and a load side bus, said frame module being shaped to define a recess extending inwardly from an outer surface of said frame module;

an electronics module releasably connected to said frame module and to said transformer, said electronics module having a housing shaped to define an interior space, a circuit board assembly mounted within said interior space, and a facing surface providing access for adjustment of said electronics module, said housing fitting shaped at least partially within said recess defined by said frame module, wherein said housing of said electronics module comprises mating housing components and a face plate which together at least partially define said interior space, and wherein said housing comprises an interior surface defining a guide for positioning said circuit board assembly; and a bracket connected to said electronics module or said frame module, said bracket being positioned for releasable engagement between said frame module and said electronics module, wherein said bracket releasably engages said electronics module to said frame module and permits removal and replacement of said electronic module with respect to said frame module.

17. The electronic trip unit defined in claim 16, wherein said face plate defines an opening extending therethrough for access to said interior space.

18. The electronic trip unit defined in claim 17, wherein said opening defined by said face plate provides viewing access to a display attached to said circuit board assembly.

19. The electronic tip unit defined in claim 16, wherein said circuit board assembly comprises a plurality of boards and wherein said interior surface of said housing defines a plurality of guides for positioning said boards and for maintaining a predetermined distance between facing surfaces of said boards.

20. The electronic trip unit defined in claim 16, wherein said engagement surface extends outwardly from said housing for engagement within said recess of said frame module.

21. The electronic trip unit defined in claim 16, wherein said electronics module is programmable for use with various frame modules to provide circuit breakers having predetermined ratings and interruption capabilities.

* * * * *